United States Patent
Inagaki et al.

(10) Patent No.: US 7,960,028 B2
(45) Date of Patent: Jun. 14, 2011

(54) HEAT-SHRINKABLE POLYESTER-TYPE FILM

(75) Inventors: Kyoko Inagaki, Inuyama (JP); Satoshi Hayakawa, Inuyama (JP); Masatoshi Hashimoto, Inuyama (JP); Norimi Tabota, Inuyama (JP); Naonobu Oda, Inuyama (JP)

(73) Assignee: Toyo Boseki Kabushiki Kaisha, Osaka-Shi (JP)

(*) Notice: Subject to any disclaimer, the term of this patent is extended or adjusted under 35 U.S.C. 154(b) by 1176 days.

(21) Appl. No.: 10/539,478

(22) PCT Filed: Dec. 24, 2003

(86) PCT No.: PCT/JP03/16650
§ 371 (c)(1),
(2), (4) Date: Jun. 22, 2005

(87) PCT Pub. No.: WO2004/063255
PCT Pub. Date: Jul. 29, 2004

(65) Prior Publication Data
US 2006/0063008 A1    Mar. 23, 2006

(30) Foreign Application Priority Data

Dec. 24, 2002  (JP) .................................. 2002-372651
Feb. 7, 2003   (JP) .................................. 2003-031353
Mar. 31, 2003  (JP) .................................. 2003-094556

(51) Int. Cl.
*B32B 27/36* (2006.01)
*B32B 27/40* (2006.01)
*B05D 3/12* (2006.01)

(52) U.S. Cl. .................. 428/423.7; 428/423.1; 428/480
(58) Field of Classification Search ............... 428/423.1, 428/423.7, 480; 427/331
See application file for complete search history.

(56) References Cited

U.S. PATENT DOCUMENTS 5,281,472 A     1/1994  Takahashi et al.
6,663,929 B1 *  12/2003 Tabota et al. ................ 428/35.7

FOREIGN PATENT DOCUMENTS

| EP | 0 135 982 A1 | 4/1985 |
| EP | 0 505 861 A2 | 9/1992 |
| JP | 1-153735 | 6/1989 |
| JP | 04-307238 A | 10/1992 |
| JP | 07-232420 A | 9/1995 |
| JP | 10-017818 A | 1/1998 |
| JP | 11188817 | 7/1999 |
| JP | 2001-205703 | 7/2001 |
| JP | 2002-068202 A | 3/2002 |
| JP | 2002166509 A * | 6/2002 |
| JP | 2002-196677 | 7/2002 |

OTHER PUBLICATIONS

Japan Patent Office, Notification of Reasons for Rejection in related Japanese patent application No. 2005-512872, mailed May 25, 2010.

* cited by examiner

*Primary Examiner* — Thao T. Tran
(74) *Attorney, Agent, or Firm* — Kenyon & Kenyon LLP

(57) ABSTRACT

A heat-shrinkable polyester type film has a dynamic friction coefficient of at least one face with one face of another film of $\mu d \leqq 0.27$ and range $R \leqq 0.05$ and a weight loss of less than 0.24 g/m² after 10 reciprocation times with 400 g load using a color fastness rubbing tester comprising a friction element bearing a sand paper with #1000 particle diameter.

17 Claims, 1 Drawing Sheet

HEAT-SHRINKABLE POLYESTER-TYPE FILM

This is a 371 national phase application of PCT/JP2003/016650 filed 24 Dec. 2003, claiming priority to Japanese Patent Applications No. 2002-372651 filed 24 Dec. 2002, No. 2003-031353 filed 7 Feb. 2003, and No. 2003-094556 filed 31 Mar. 2003, the contents of which are incorporated herein by reference.

TECHNICAL FIELD

The first invention relates to a heat-shrinkable polyester type film excellent in a slipping property and abrasion resistance and more particularly to a heat-shrinkable polyester type and easily slipping film having a good slipping property in the outer face when used as a label for a beverage bottle, stain-proofness against wear debris at the time of secondary processing or in a vending machine, and suitable for use as labels for beverages to be sold by automatic vending machines.

The second invention relates to a heat-shrinkable polyester type and easily slipping film excellent in a slipping property in the inner face in the case of using the film as a label for a beverage bottle and suitable for use as labels for beverages having a good slipping property in relation to PET bottles.

BACKGROUND ART

Conventionally, heat-shrinkable polyester films have been used in a wide variety of uses such as shrinkable wrapping materials, shrinkable labels and the like owing to the property of shrinkage by heating. Among them, oriented films such as poly(vinyl chloride) type films, polystyrene type films, polyester type films have been used as labels and cap seals for various containers such as polyethylene terephthalate (PET) containers and glass containers, or for integral wrapping.

However, for example, the poly(vinyl chloride) type films have a problem that the films are inferior in heat resistance, emit hydrochloric acid gas at the time of incineration, and generate substances possible to convert into dioxins. Also, in the case heat-shrinkable poly(vinyl chloride) type resin films are used for shrinkable labels for PET containers or the like, there is a problem that the labels have to be separated from containers for recycling the containers.

On the other hand, the polystyrene type films can be evaluated highly in terms of good finishing appearances after shrinkage, but they are inferior in solvent resistance so that specific ink compositions have to be used for printing. With respect to polystyrene type resins, there is another problem that it is needed for the resins to be incinerated at a high temperature and a large quantity of black smoke and malodorous gas are emitted at the time of incineration.

It is therefore highly expected that the polyester type films free from such problems are to be used as shrinkable labels in place of the poly(vinyl chloride) type films and polystyrene type films, and along with increase of the use of PET containers, their use tends to be increased. However, it is required also for the conventional heat-shrinkable polyester type films to be improved more in the properties.

For example, in the case of using the films as labels of beverage-containing PET containers and vending the beverage by an automatic vending machine, there occurs a problem that the slipping property of the labels is so insufficient as to cause clogging in the machine, that is, goods cannot pass in the path and reach the exit slot of the machine or that several good are discharged simultaneously and accordingly, the slipping property of the films is required to be good from users.

As a countermeasure to the problem, a method of laminating layers with good slipping properties on film surfaces have been employed (e.g. reference to Japanese Patent Laid-Open Publication No. 2002-196677).

However, as a new problem of such treatment, stain adhesion of wear debris of films to contact rolls at the time of labeling work or to label contact parts in the automatic vending machine takes place.

In addition, recently, shrinkage labels tend to be used increasingly for the purpose of protecting the contents of containers from ultraviolet (UV) rays. Conventionally, UV ray-cut type poly(vinyl chloride) films have been used, but it has been required to urgently develop other materials for cutting UV rays. Although it depends on the contents, it is very important that the UV ray-cutting capability is to cut UV rays in a longer wavelength range, particularly in a range from 380 nm to 400 nm, since the contents are denatured or colored in the longer wavelength range of UV rays, that is, from 360 nm to 400 nm, in the case of food and beverages. In the case of using these heat-shrinkable films, normally, after designs are printed in the inside of the labels, white printing is carried out (e.g. reference to Japanese Patent Laid-Open Publication No. 11-188817).

The above-mentioned white printing is to be set in the sides of the labels to be brought into contact with PET bottles in the case of threading the labels to the bottles, the white printing is very important to have good slipping property to PET bottles. If the slipping property is inferior, the labels are shrunk in upper parts of the bottles before they move to prescribed positions where they are to be shrunk to result in production loss. Generally, it is common to attach labels after PET bottles are filled with a beverage and the bottle surface bears water droplets. Since the insertion resistance is higher in the state that the bottle surface is wet than in the state the bottle surface is dry and accordingly, there is a problem that the value of the insertion resistance is changed depending on the types of white printing.

Moreover, the thickness of white printing ink layer is generally about 3 μm and insufficient to shield light rays. Although it is tried to shield light rays by carrying out white printing two times, it is disadvantageous in terms of the quality (alteration of shrinking properties owing to thickness of the ink layer), the time limit of shipment, and the cost.

DISCLOSURE OF THE INVENTION

In view of the above-mentioned state of the art, a first object of the invention is to provide a film having good transparency and printability, capable of preventing a goods from clogging in an automatic beverage-vending machine owing to good slipping property in the outer surface of a bottle in the case of using the film for a label for PET-bottled beverage, and excellent in abrasion resistance.

In order to solve the above-mentioned problems, a second object of the invention is to provide a heat-shrinkable polyester type film for a full label of a PET bottle, having good slipping property to the PET bottle.

A heat-shrinkable polyester type film excellent in the slipping property which can solve the above-mentioned problems is characterized in that the film has a dynamic friction coefficient of at least one face with one face of another film of $\mu d \leq 0.27$ and range $R \leq 0.05$ and more preferably $\mu d \leq 0.25$ and range $R \leq 0.03$ and a weight loss of less than 0.24 g/m$^2$ and more preferably less than 0.20 g/m$^2$ after the film is subjected to reciprocating abrasion 10 times with 400 g load using a color fastness rubbing tester comprising a friction element bearing a sand paper with #1000 particle diameter.

If the heat-shrinkable polyester type film satisfies these ranges, in the case of using the film for a label of a PET-bottled beverage, the film provided is capable of preventing clogging in an automatic vending machine, excellent in abrasion resistance, and free from stains of wear debris.

In this case, a dynamic friction coefficient of at least one face of the film with one face of another film is preferably $\mu d \leq 0.25$ and range $R \leq 0.03$.

Also, in this case, a weight loss after the easily-slipping face of the film is subjected to reciprocating abrasion 10 times with 400 g load using a color fastness rubbing tester comprising a friction element bearing a sand paper with #1000 particle diameter is preferably less than 0.20 g/m$^2$.

Further, in this case, the surface specific resistance of at least one face of the film is preferably $\log \Omega \leq 14.0$.

Further, in this case, the surface specific resistance of at least one face of the heat-shrinkable polyester type film is preferably $\log \Omega \leq 12.0$.

In such cases, troubles of static electricity at the time of processing, for example, workability deterioration such as winding of films on a roll, giving shocks to human being, and handling difficulty in printing, adhering, secondarily processing process or the like; and product value deterioration such as occurrence of printing smear and stains on film surfaces can be prevented.

Further, in this case, it is also preferable that one face and the other face of the film are adhesive to each other by an organic solvent.

In this case, it is also preferable to form an easily slipping layer containing a polyester type resin or a polyurethane type resin as a binder on the easily-slipping face of the film.

In this case, it is also preferable to form an easily slipping layer containing a lubricating component 10 to 60% by weight in 100% by weight of the layer, on the easily-slipping face of the film.

In this case, it is also preferable for the easily slipping layer of the film to be formed in a deposition amount of 0.002 to 0.2 g/m$^2$.

In this case, it is also preferable for the easily slipping layer of the film to contain 1 to 40% by weight of a sulfonic acid type component in 100% by weight of the easily slipping layer.

In this case, the production method is preferable to involve applying a coating solution for the easily slipping layer containing a lubricating component and a sulfonic acid type component to at least one face of a non-oriented polyester type film or a uniaxially oriented polyester type film obtained by melt extrusion, and then uniaxially or biaxially drawing the coated film.

The second invention relates to a heat-shrinkable polyester type film containing mainly a polyester resin and having 0.8 N or lower of insertion resistance value between a PET bottle and a label defined as follows.

The insertion resistance value means the value calculated by the following measurement.

A label with 120 mm height and 175 mm in folding diameter and having an easily slipping face in the inner face side is produced. From a 2 liter-capacity PET bottle (manufactured by CCJC: height 307 mm) used for Sokenbicha (trade name) is cut off an upper portion from 245 mm height and the label is put on. The maximum resistance value is measured using Strograph (V10-C model) manufactured by Toyo Seiki in compression mode (crosshead speed: 200 mm/min) when the label is pushed down from the upper part and the value is defined as the label insertion resistance (the number of measurement times=20). Also, the maximum resistance value is measured in a state that water is sprayed to the PET bottle (the number of measurement times=20).

In this case, it is preferable for the film to have 40% or lower of total luminous transmittance, 40% or higher of hot water shrinkage ratio in the main shrinkage direction and 10% or lower of hot water shrinkage ratio in the direction orthogonal to the main shrinkage direction by treatment at 98° C. for 10 seconds.

In this case, the film is preferable to be excellent in a solvent bonding property.

Further, in this case, the film is preferable to have at least one layer containing fine particles and an incompatible resin.

BEST MODES OF EMBODIMENTS OF THE INVENTION

Figure 1:
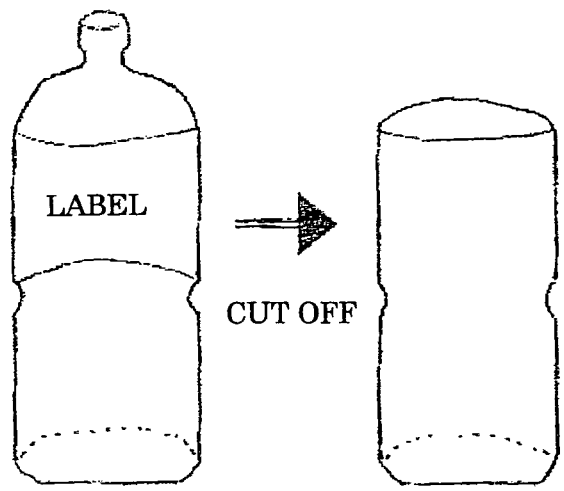
FIG. 1 shows an explanatory drawing of a 2 liter-capacity PET bottle (manufactured by CCJC: height 307 mm) used for Sokenbicha cut in an upper portion from 245 mm height.
Figure 2:
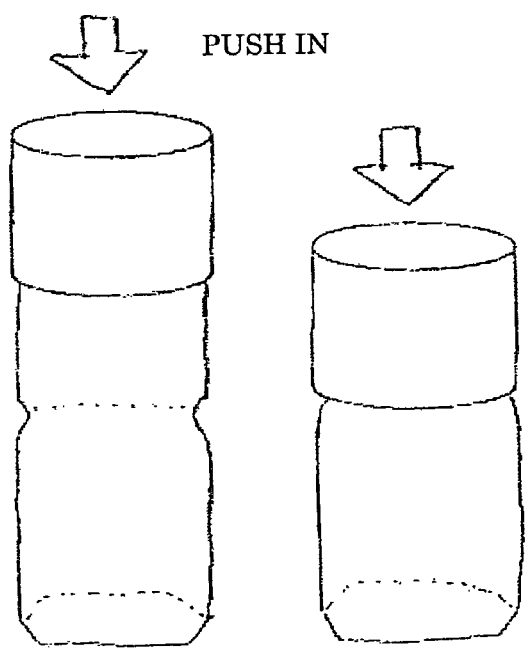
FIG. 2 is an explanatory drawing explaining pushing a label from the upper part (crosshead speed: 200 mm/min) using Strograph (V10-C model) manufactured by TOYO SEIKI KOGYO CO., LTD in compretion mode.

A heat-shrinkable polyester type film of the invention is obtained from single polyester copolymers (including ternary copolymers) comprising an ester unit formed from a known polycarboxylic acid component and a polyhydric alcohol component as a main constituent unit, or mixtures of two or more kinds of homo- or co-polyesters which have different compositions.

The film of the invention has a shrinkage ratio of 50% or higher, preferably 60 to 80%, in the main shrinkage direction by treatment with hot water at 98° C. for 10 second treatment time. If the shrinkage ratio is lower than 50%, shrinkage of a label become insufficient in the thin mouth part of a PET bottle. On the other hand, if it exceeds 80%, jumping up of the label takes place during passage of a shrinkage tunnel since shrinkage is large. Therefore both cases are not preferable. Herein, the main shrinkage direction means the direction where the shrinkage is significant.

The shrinkage ratio in the direction orthogonal to the main shrinkage direction is 10% or lower, preferably 0 to 7%. If the shrinkage ratio is lower than 0% and rather the label tends to be expanded, the transverse wrinkles caused at the time of shrinkage tend to be difficult to disappear and on the other hand, if it exceeds 10%, the vertical shrinkage of the label becomes significant and the quantity of the film to be used is increased to result in a problem in terms of the cost and therefore, both cases are not preferable.

Herein, the hot water shrinkage ratio at 95° C. means a value obtained by measuring the size (horizontal and vertical size) of a sample of a heat-shrinkable polyester type film (the entire laminate film in the case the easily slipping layer is layered) after the sample cut in a 10 cm×10 cm square shape is immersed in hot water at 95° C. for 10 seconds, and carrying out calculation according to the following equation, and the larger value of those in the vertical direction and the transverse direction is defined as the hot water shrinkage ratio in the main shrinkage direction.

Shrinkage ratio (%)=(size before heating−size after heating)/(size before heating)×100.

Such a heat-shrinkable polyester type film will be described more in detail. As a dicarboxylic acid component composing a polyester in the raw material composition to be used for the heat-shrinkable polyester type film of the invention, besides terephthalic acid composing an ethylene terephthalate unit, aromatic dicarboxylic acids and alicyclic dicarboxylic acids can be used.

Examples of the aromatic dicarboxylic acid may include benzenecarboxylic acids such as isophthalic acid, orthophthalic acid, 5-tert-butylisophthalic acid, and sodium 5-sulfoisophthalate; naphthalenedicarboxylic acids such as 2,6-naphthalenedicarboxylic acid; dicarboxybiphenyls such as 4,4'-dicarboxydiphenyl and 2,2,6,6,-tetramethylbiphenyl-4,4'-dicarboxylic acid; 1,1,3-trimethyl-3-phenylindene-4,5-dicarboxylic acid and its substitution compounds; 1,2-diphenoxyethane-4,4'-dicarboxylic acid and its substitution compounds, and the like.

Examples of the fatty acid type carboxylic acids are oxalic acid, malonic acid, succinic acid, glutaric acid, adipic acid, azelaic acid, sebacic acid, pimellic acid, suberic acid, undecanoic acid, dodecanedicarboxylic acid, brassylic acid, tetradecanedicarboxylic acid, thapsinic acid, nonadecanedicarboxylic acid, docosanedicarboxylic acid and their substitution compounds, 4,4'-dicarboxycyclohexane and its substitution compounds, and the like.

As a diol component of the polyester contained in the raw material composition, ethylene glycol composing the polyethylene terephthalate unit can be used and further aliphatic diols, alicyclic diols, and aromatic diols are all usable.

Examples of the aliphatic diol are diethylene glycol, propylene glycol, butanediol, 1,6-hexanediol, 1,10-decanediol, neopentyl glycol, 2-methyl-2-ethyl-1,3-propanediol, 2-diethyl-1,3-propanediol, 2-ethyl-2-n-butyl-1,3-propanediol and the like. Examples of the alicyclic diols are 1,3-cyclohexanedimethanol, 1,4-cyclohexanedimethanol and the like. Examples of the aromatic diols are ethylene oxide adducts of bisphenol type compound such as 2,2-bis(4'-β-dydroxyethoxyphenyl)sulfone, xylene glycol and the like. Further, polyalkylene glycol such as polyethylene glycol and polypropylene glycol are also usable as the diol components.

The polyester to be added to the above-mentioned raw material composition comprises the above-mentioned acid component and diol component and to produce the polyester, it is preferable to use one or more types of acid components and diol components in combination for improvement of the properties of the heat-shrinkable film. The types and the contents of the monomers to be used in combination may properly be determined depending on the desired film properties and in terms of costs. The raw material composition contains one or more types of polyesters. If one kind polyester is added, a polyester copolymer comprising an ethylene terephthalate unit should be used. In the case two or more types of polyesters are added, mixtures of polyester copolymers and polyester homopolymers of desired compositions may be used. Generally, since the polyester copolymer has a low melting point, there is a problem of handling at the time of drying and the like and therefore, it is preferable to use mixtures of polyester homopolymers (e.g. poly(ethylene terephthalate), poly(ethylene naphthalate), poly(1,4-cyclohexenediethylene terephthalate)) and polyester copolymers. Additionally, in the case the mixtures are formed into heat-shrinkable polyester type films, it is preferable that 1 to 2% by mole in the entire polyester is aliphatic dicarboxylic acid unit. The shrinkage starting temperature can be controlled as desired by controlling the ratio in the defined range.

The polyester in the above-mentioned raw material composition can be produced by any conventional method. For example, the polyester may be produced by a direct esterification method by directly reacting a dicarboxylic acid with a diol; and an ester exchange method by reacting dimethyl dicarboxylate with diol. The preparation may be carried out by any method in batch type manner or continuous production manner.

The raw material composition may contain a variety of known additives based on necessity other than the polyester. Examples of the additives are a lubricant such as titanium dioxide, finely granular silica, kaolin, and calcium carbonate; an antistatic agent; an aging prevention agent; a UV absorbent; a coloring agent (a dye and the like).

The above-mentioned raw material composition may be formed into a film-like shape by a conventionally known method (e.g. an extrusion method, a calendaring method). The film-like shape may be plane form or tubular form and is not particularly limited. As the drawing method, for example, conventionally known methods such as a roll drawing method, a long gap drawing method, a tenter drawing method, and a tubular drawing method can be employed. In any of these methods, successive biaxial drawing, simultaneous biaxial drawing, uniaxial drawing, and their combination may be employed to carry out drawing.

In the case of above-mentioned biaxial drawing, the drawing in the vertical and transverse directions may not be carried out simultaneously and drawing in either one direction may be carried out. The drawing ratio may be set optionally in a range of 1.0 times to 7.0 times and it is preferable to set the drawing ratio 3.5 times or higher in a prescribed one direction.

In the drawing process, it is preferable to carry out preheating at temperature not lower than glass transition temperature (Tg) of the polymers composing the film and, for example, not higher than Tg+80° C. It is recommended, for example, to carry out a heat set of passing a heating zone of 30 to 150° C. for about 1 to 30 seconds after drawing in the case of the drawing process. Further, after drawing the film, before or after the execution of the heat set, drawing may be carried out to a prescribed extent. Also, after the above-mentioned drawing, a step of cooling the film while applying a stress to the film by stretching or keeping the film tense, or a step of cooling even after releasing the tense state following the former may be added. The thickness of the film to be obtained is preferably in a range of 6 to 250 μm.

In the heat-shrinkable polyester type film of the invention, the film can be adjusted to have 40% or less total luminous transmittance measured according to JIS K 7136. Adjustment of the transmittance to 40% or less makes the contents not seen and prevents deterioration of the contents owing to light ray cutting function. The transmittance is more preferably 30% or less.

Such a heat-shrinkable polyester type film can be obtained from a polyester resin, or a polyester resin and titanium oxide, and a polystyrene resin, which will be described later. As the polyester resin, for example, a polyester composition containing a polyester composed of a dicarboxylic acid component and a diol component as constituents and a polyester type elastomer can be used preferably. The mixing ratio of the polyester and the polyester type elastomer in the polyester resin composition is generally about 50 to 99% by weight, preferably about 70 to 97% by weight for the former and 1 to 50% by weight, preferably about 3 to 30% by weight for the latter, relative to total weight of the polyester and the polyester type elastomer.

As the dicarboxylic acid component composing the above-mentioned polyester, one or more types of well known dicarboxylic acids, for example, aromatic dicarboxylic acids such as terephthalic acid, isophthalic acid and naphthalenedicarboxylic acid; aliphatic dicarboxylic acids such as adipic acid, sebacic acid and decanedicarboxylic acid; alicyclic dicarboxylic acid such as cyclohexanedicarboxylic acid and the like may be used. On the other hand, as the diol component, one or more types of well known diols, for example, ethylene glycol, propylene glycol, triethylene glycol, butylene glycol, diethylene glycol, neopentyl glycol, 1,4-cyclohexanedimethanol, tetramethylene glycol ethylene oxide adduct, and the like may be used.

The above-mentioned polyester type elastomer may be, for example, polyester type block copolymers comprising high melting point crystalline polyester segments (Tm 200° C. or higher) and low melting point soft polymer segments (Tm 80° C. or lower) with a molecular weight of 400 or higher, preferably 400 to 800, and polyester type elastomers comprising polylactone such as poly($\epsilon$-caprolactone) as the low melting point soft polymer segments are particularly preferable.

To satisfy the specified total luminous transmittance of the film of the invention and provide the film with the light ray cutting function, it is desirable, for example, to add fine particles of an inorganic or organic lubricant in an amount of 0.1 to 20% by weight, preferably 0.5 to 10% by weight in the total weight of the film. If the content of the fine particles is lower than 0.1% by weight, it tends to be difficult to obtain the light ray cutting function and if it exceeds 20% by weight, the film strength tends to be decreased and it tends to be difficult to form a film.

The fine particles may be added before polyester polymerization, however it is general to add the fine particles after polyester polymerization. Examples of the inorganic lubricant to be added in form of the fine particles may include conventionally known inactive particles such as kaolin, clay, calcium carbonate, silicon oxide, calcium terephthalate, aluminum oxide, titanium oxide, calcium phosphate and carbon black; high melting point organic compound which is not melt in melt film production, and metal compound catalyst used for synthesis of crosslinked polymers and polyester, for example, inner particles to be formed in the inside of polymers at the time of polyester production by an alkali metal compound, an alkaline earth compound or the like.

The average particle diameter of the fine particles to be contained in the film is generally in a range of 0.001 to 3.5 μm. Herein, the average particle diameter of the fine particles is measured by Coulter Counter method. The limiting viscosity number of the polyester of the invention is preferably 0.50 or higher, more preferably 0.60 or higher, and even more preferably 0.65 or higher. If the limiting viscosity number of the film is less than 0.50, the crystallinity is too high to obtain sufficient shrinking ratio and therefore, it is undesirable.

To obtain a proper luminous transmittance in the invention, it is preferable, for example, to form fine voids in the inside. For example, a foaming material may be added and then extrusion may be carried out, and a preferable method for forming voids is an incompatible thermoplastic resin maybe added to the polyester and then the mixture is drawn at least uniaxially. The thermoplastic resin incompatible with the polyester to be used in the invention is optional and not particularly limited if it is incompatible with the polyester. Practically, a polystyrene type resin, a polyolefin type resin, a polyacrylic resin, a polycarbonate resin, a polysulfone resin, and a cellulose type resin can be exemplified. Particularly, owing to the formability of the voids, the polystyrene type resin and the polyolefin type resin such as polymethylpentene and polypropylene are preferable.

The polystyrene type resin means a thermoplastic resin comprising polystyrene structure as a basic constituent element and includes homopolymers such as atactic polystyrene, syndiotactic polystyrene, and isotactic polystyrene; modified resins obtained by graft or block copolymerizing other components such as an impact resistant polystyrene resin and modified polyphenylene ether resin; and also mixtures of the resin containing thermoplastic resins, e.g. polyphenylene ethers, compatible with these polystyrene type resins.

To prepare the polymer mixture by adding a resin incompatible with the above-mentioned polyester, the mixture may be produced, for example, by mixing, melting and kneading respective resin chips in an extruder and extruding the molten mixture, or by previously kneading resins with a kneading apparatus, and melting and extruding the kneaded mixture by an extruder. Further, a polystyrene type resin may be added, stirred and diffused in preparation in polymerization step of the polyester and the chips obtained thereby may be melted and extruded.

With respect to the film of the invention, it is preferable to form a layer A with less voids than those in a layer B on at least one face of the layer B having a large number of voids in the inside. To form such a structure, it is preferable that different raw materials A and B are fed respectively to different extruders and melted and stuck to each other in front of a T die or in the inside of a die in molten state, and then they are closely fixed by cooling rollers and then drawn at least in one direction. In this case, the incompatible resin as a raw material is preferable to be less in the layer A than in the layer B. Accordingly, the voids in the layer A are less and the surface roughness is suppressed to give a film for good printing appearance. Further, since a large number of voids do not exist, the stiffness of the film is kept high and the obtained film becomes excellent in attachability.

Further, the film of the invention is particularly preferable to have the layer B having a large number of voids in the inside as an intermediate layer and the layer A as both surface layers. Since the polystyrene type resin is added, smoke is emitted at the time of melting and extruding the resin mixture to stain the process and deteriorate the workability. The smoking problem is solved by using the layer B as an intermediate layer and stable production is made possible for a long time.

The film of the invention may further contain, based on necessity, additives such as a stabilizer, a coloring agent, an antioxidant and an anti-static agent.

To satisfy the above-mentioned properties, the film of the invention may comprise a single layer or is preferable to have A/B/A layer structure. The ratio of the thickness of the layers A and layer B is preferable to be A/B/A=25/50/25 to 10/80/10. If the ratio of the thickness of the layer B is less than 50%, the light ray cutting capability is insufficient and the contents may be seen through or the contents may be deteriorated owing to insufficient cutting of light rays and therefore, it is not preferable.

The heat-shrinkable polyester type film excellent in the slipping property of the first invention has a dynamic friction coefficient of at least one face with one face of another film of $\mu d \leqq 0.27$ and range $R \leqq 0.05$ and more preferably $\mu d \leqq 0.25$ and range $R \leqq 0.03$. In the case the film satisfies the range, the film is provided with a good slipping property in an automatic venting machine when it is used as a label for a PET bottle for a beverage and thus the film can prevent occurrence of clogging even if the bottle is, for example, a square type bottle which has a high contact surface area with neighboring products and with the inside of the automatic venting machine and is easy to cause clogging. However, if the dynamic friction coefficient exceeds the range, the film is insufficient in the slipping property and causes a trouble of clogging the automatic venting machine with the bottles.

With respect to the heat-shrinkable polyester type film of the first invention, the face satisfying the above-mentioned slipping property has the following characteristic. That is, after a film sample is subjected to reciprocating abrasion under conditions of 30 reciprocation times/min in 100 mm reciprocating distance with 400 g load using a color fastness rubbing tester comprising a friction element (surface radius 45 mm; arc 50 mm; and width 25 mm) to which two sheets of gauze and a sand paper with #1000 particle diameter are attached in a manner that the sand paper is set in the front face side while the film sample is set on a sample stand (surface radius 200 mm) in a manner that the face satisfying the slipping property is in the front face side, the weight loss per unit surface area of the treated part after 10 reciprocation times is less than 0.24 g/m$^2$, more preferably less than 0.20 g/m$^2$, and even more preferably less than 0.18 g/m$^2$. In the case of carrying out printing on the film or processing the film to be tubular at the time of producing a label, the surface of the moving film is brought into contact with guide rolls of a secondary processing apparatus or in an automatic venting machine, a beverage bottle bearing the label passes in a path and the label and the inside of the machine are brought into contact with each other and if the weight loss satisfies the above-mentioned range, no stain of wear debris is caused by the contact and friction.

The heat-shrinkable polyester type film excellent in the slipping property of the second invention is a film comprising mainly a polyester resin and the dynamic friction coefficient of at least one face with one face of another film is $\mu d \leq 0.27$ and the insertion resistance value of the film bonded to be a tubular product (hereinafter, referred to as a label) to a PET bottle is 0.8 N or lower.

The insertion resistance value means the value calculated by the following measurement method.

A label with 120 mm height and 175 mm in folding diameter and having an easily slipping face in the inner face side is produced. From a 2 liter-capacity PET bottle (manufactured by CCJC: height 307 mm) used for Sokenbicha is cut off an upper portion from 245 mm height and the label is put on. The maximum resistance value is measured by Strograph (V10-C model) manufactured by TOYO SEIKI KOGYO CO., LTD. when the label is pushed down from the upper part in compression mode (crosshead speed: 200 mm/min) and defined as the label insertion resistance (the number of measurement times=20). Also, the maximum resistance value is measured in a state that water is sprayed to the PET bottle (the number of measurement times=20) in a similar manner.

The heat-shrinkable polyester type film of the invention can be produced by laminating the easily slipping layer on the surface layer.

It is recommended for the heat-shrinkable polyester type film of the invention to contain a lubricant in the easily slipping surface layer.

As the lubricant, at least one of the following substances is preferably to be added: paraffin wax, microcrystalline wax, polypropylene wax, polyethylene wax, ethylene-acrylic wax, stearic acid, behenic acid, 12-hydroxystearic acid, stearic acid amide, oleic acid amide, erucic acid amide, methylene bis(stearic acid amide), ethylene bis(stearic acid amide), ethylene bis(oleic acid amide), butyl stearate, stearic acid monoglyceride, pentaerythritol tetrastearate, cured castor oil, stearyl stearate, siloxane, a higher alcohol type polymer, stearyl alcohol, calcium stearate, zinc stearate, magnesium stearate, and lead stearate. Among them, addition of low molecular weight polyethylene wax is highly effective to improve the slipping property and therefore it is preferable. The addition amount is preferably 10 to 60% by weight and more preferably 15 to 50% by weight in the easily slipping layer. If the addition amount is less than 10% by weight, the effect to improve the slipping property is slight and at the same time, the wear debris by friction are easily generated. If it exceeds 60% by weight, the hardness of the layer is decreased and transferring or printing of the components of the coating layer may be inhibited and also, the solvent bonding property is deteriorated and therefore, it is not desirable.

The slipping property can further be improved by adding inorganic particles of silica, titania, mica, talc, calcium carbonate or the like; organic particles of poly(methyl methacrylate) (PMMA), a styrene-divinylbenzene resin, a formaldehyde resin, a silicone resin, polyamide imide, benzoguanamine or the like; or their surface-treated products. However, the transparency and the scratching resistance of the film tend to be decreased owing to formation of surface roughness and therefore, it is recommended to add them in a range of the amount proper to avoid deterioration of these properties.

Particularly, the center plane average roughness of the face in the side having a satisfying dynamic friction coefficient in the above defined range is preferably $\leq 0.03$ and accordingly, the slipping property can be provided without deteriorating the transparency of the film for a label.

Static electricity causes troubles at the time of processing, for example, problems of workability deterioration or safety such as winding on rolls, shock on human being, and handling difficulty in printing, adhering, secondary processing process or the like; and deterioration of the product value such as occurrence of printing smear and film surface stains, and from a viewpoint of prevention of these troubles, it is preferable to suppress the surface specific resistance of the easily slipping layer.

The surface specific resistance of the easily slipping layer is preferably log $\Omega$<14.0 and more preferably log$\Omega$<12.0

To suppress the surface specific resistance, an antistatic agent is preferably to be added and as the antistatic agent, surfactants such as quaternary ammonium salts, fatty acid polyhydric alcohol esters, polyoxyethylene adducts, betaine salts, alanine salts, phosphate salts, sulfonic acid type components such as sulfonic acid salts, and polyacrylic acid derivatives are effective.

Examples of the sulfonic acid type components for preventing static electricity may be paraffinsulfonic acid salts such as sodium paraffinsulfonate; alkylbenzenesulfonic acid salts such as sodium alkylbenzenesulfonate; alkylnaphthalenesulfonic acid salts such as sodium alkylnaphthalenesulfonate;α-olefinsulfonic acid salts such as sodium α-olefinsulfonate; alkylsulfonic acid salts of higher fatty acid amides known as Igepon T; dialkylsulfosuccinic acid salts such as sodium di-2-ethylhexylsuilfosuccinate; sodium diphenyl ether sulfonate; sodium alkyiphenyl oxide sulfonate; α-sulfonated fatty acids; α-sulfonated fatty acid esters; barium dinonylnaphthalenesulfonate, and the like.

These sulfonic acid components not only provide the antistatic effect to the easily slipping layer but also cause effects of surfactants at the time of producing a water dispersion of a coating solution for forming the easily slipping layer to give a stable water-based coating solution. Among them, since being excellent in the effect of providing water dispersibility and having good antistatic effect with little adverse effect on others, sodium paraffinsulfonate, alkylbenzenesulfonic acid salts, and sodium diphenyl ether sulfonate are preferably to be used. In addition to the above-mentioned advantageous points, sodium paraffinsulfonate has high compatibility with a polyester resin and a polyurethane resin to be preferably used as a binder and is excellent in the adhesion property to the heat-shrinkable polyester type film on which the easily slipping layer is to be formed and therefore, it is most preferable.

The addition amount of the component is preferably in a range of 1 to 40% by weight as the content in the easily slipping layer and if it is less than 1% by weight, the effect to improve the antistatic property is slight and the surface specific resistance of the film cannot be kept to satisfy log $\Omega$<14.0. On the other hand, if it exceeds 40% by weight, the slipping property of the film is deteriorated. Further, the transparency is also deteriorated and therefore, it is not preferable. The addition amount of the sulfonic acid type component is more preferably 5% by weight as the lower limit and 35% by weight as the upper limit.

If the easily slipping layer is formed on the surface of the polyester type film only from the lubricating component or the lubricating component in combination with the sulfonic acid type component, it is difficult to avoid a trouble of separation of the easily slipping layer and the like, and for that, it is preferable to form the easily slipping layer using a binder resin.

As the above-mentioned binder resin component, for example, polyester type resins, polyamide type resins, polyurethane type resins, epoxy type resins, phenol type resins, acrylic resins, poly(vinyl acetate) type resins, polyolefin type resins such as polyethylene and polypropylene, their copolymers and modified resins, cellulose type resins, and the like can be exemplified.

Particularly, polyester type resins, polyurethane type resins, or their copolymers show a good slipping property by combination with a lubricant and do not inhibit adhesion with a solvent in the process of processing the film to be tubular. The addition amount of the component is preferably in a range of 30 to 85% by weight as the content in the easily slipping layer. If it is less than 30% by weight, the strength of the easily slipping layer is decreased and accordingly the abrasion resistance is decrease and the wear debris are easy to be generated. At the same time, the transferring or printing of the components of the coating layer may be inhibited. If it exceeds 85% by weight, the slipping property is deteriorated.

The method for forming the easily slipping layer is not particularly limited as long as the layer is formed evenly on the surface, and a method of laminating a easily slipping resin on the surface by melt-extruding the resin, a method (inline coat) of applying an easily slipping coating solution in the film formation process, and a method (off-line coat) of applying an easily slipping coating solution after the film formation process can be exemplified. In terms of the cost and the effect to improve the abrasion resistance, since the adhesion property of the coating layer and the film becomes good owing to drawing and thermal treatment carried out after the coating and the layer becomes tough by the drawing, the inline coat is preferable to form the layer and a reverse roll method, an air knife method, a fountain method and the like can be exemplified.

From an aspect of the safety and environment-friendly property, as the coating solution, it is preferable to use a water-based dispersion, and prescribed amounts of a lubricating component and a sulfonic acid type components are added to a water-based dispersion of the above-mentioned binder resin (particularly, a polyester resin or a polyurethane resin) and other additives may be added based on the necessity. They are mixed to prepare a coating solution, and the solution is applied to at least one face of the polyester film and then dried. If a sulfonic acid (or its salt) group is introduced into the binder resin itself, the water dispersibility is improved and therefore, it is preferable. Production methods of the heat-shrinkable polyester type film of the invention and the easily slipping layer will be described more in detail later.

It is particularly recommended to form the easily slipping layer on the surface of the heat-shrinkable film by the inline coating method using as the binder resin component of the invention, the polyester type resin, the polyurethane type resin, or their copolymer; as the lubricating agent, a low molecular weight polyethylene wax; and as the antistatic agent, sodium alkylsulfonate. With respect to the coating process, it is preferable to apply the above-mentioned easily slipping coating solution to the film surface smoothly and evenly in the thickness after a polyester type raw material composition is formed into a film-like shape by a melting and extruding method or after the formed film-like material is drawn uniaxially. After that, the film is heated and drawn uniaxially or biaxially so as to draw the coating layer along with the film and thus it is effective to improve the adhesion strength to the film and the toughness. The process also contributes to improvement of the abrasion resistance and therefore, the process is recommended.

The application amount of the coating solution is preferably 0.002 to 0.2 g/m$^2$ and more preferably 0.002 to 0.1 g/m$^2$ as the content on the film after drawing. If it is 0.002 g/m$^2$ or lower, the effect to improve the slipping property and the antistatic property becomes insignificant, and if it exceeds 0.2 g/m$^2$, the transparency of the film is decreased and additionally, the adhesion property by a solvent is deteriorated and wear debris tend to be generated easily.

In the case of producing a label from the heat-shrinkable polyester type film of the invention, the process of making the film tubular is carried out and bonding is frequently carried out using a solvent in the process. From this viewpoint, it is preferable to apply a solvent such as 1,3-dioxolane to one face of the film and stick the other face of the film to the coated face by pressure-bonding so as to make the bonding possible when the faces are separated in the main shrinkage direction. If insufficient, separation of the label bonded part may possibly take place at the time of thermal shrinkage attachment of the label or handing a beverage bottle.

EXAMPLES

Hereinafter, the contents of the invention will be described more in detail along with examples. However, it is not intended that the invention be limited to the illustrated examples.

The evaluation methods employed in this specification are the methods described below.

[Friction Coefficient]

The dynamic friction coefficient μd and range R (fluctuation range of the friction coefficient) between faces of a film were measured in 23° C. 65% RH environments according to JIS K-7125.

[Abrasion Resistance]

The abrasion resistance was evaluated by measuring the abrasion quantity using a color fastness rubbing tester (manufactured by YASUDA SEIKI SEISAKUSHO, LTD.). That is, after a film sample was subjected to reciprocating abrasion under conditions of 30 reciprocation times/min in 100 mm reciprocating distance with 400 g load using a friction element (surface radius 45 mm; arc 50 mm; and width 25 mm) to which two sheets of gauze and a sand paper with #1000 particle diameter were attached in a manner that the sand paper was set in the front face side while the film sample was set on a sample stand (surface radius 200 mm) in a manner that the face with a lower friction coefficient was in the front face side, the weight alteration (g/m$^2$) per unit surface area of the treated part between before and after 10 reciprocation times was measured.

[Antistatic Property]

The antistatic property was measured under conditions of 500V applied voltage, 23° C. and 65% RH by a surface resistance tester (an intrinsic resistance measurement apparatus, manufactured by KAWAGUCHI ELECTRIC WORKS).

[Haze]

Haze was measured according to JIS K 6714 using a haze meter (manufactured by NIHON SEIMITSU KIKAI KOSAKU Co, Ltd.). If the haze was 8.0% or lower, ○ was marked and if the haze exceeded 8.0%, X was marked.

[Solvent Bonding Property]

The solvent bonding property was evaluated by applying 1,3-dioxolane to one face of a film, pressure-bonding the other face of the film to the coated face and measuring the adhesion strength after leaving the film for 24 hours. The adhesive strength was measured by setting the solvent-bonded part of a sample (15 mm width) in approximately the center part between chucks in a tensile tester and pulling the sample at 23° C. and 200 mm/min pulling speed. Samples having adhesion strength exceeding 4 N/15 mm were marked with ○ and samples having adhesion strength of 4 N/15 or lower were marked with X.

[Hot Water Shrinkage Ratio]

The hot water shrinkage ratio was a value calculated by measuring the size (vertical and horizontal size) of a sample of a film after the sample of the film cut in a 10 cm×10 cm square shape was immersed in hot water at 95° C. for 10 seconds and pulled out of the hot water, and carrying out calculation according to the following equation and the larger value of the vertical direction and the transverse direction was defined as the hot water shrinkage ratio in the main shrinkage direction.

Shrinkage ratio in hot water (%)=(size before heating−size after heating)/(size before heating)×100.

[Label Insertion Resistance Value]

Each label with 120 mm and 175 mm in folding diameter and having an easily slipping face in the inner face side was produced. An upper portion of a 2 liter-capacity PET bottle (manufactured by CCJC: height 307 mm) used for Soken-bicha from 245 mm height was cut off from the bottle and the label was put on. The maximum resistance value was measured in compression mode (crosshead speed: 200 mm/min) of Strograph (V10-C model) manufactured by TOYO SEIKI KOGYO CO., LTD. when the label was pushed down from the upper part, and the value was defined as the label insertion resistance (the number of measurement times=20). Also, the maximum resistance value is measured in a state that water is sprayed to the PET bottle (the number of measurement times=20). (See FIG. 1)

Example 1

(1) Polyester Type Resin and Undrawn Film

A polyester composition containing 40 weight % of polyethylene terephthalate, 50 weight % of a polyester comprising 100 mole % of terephthalic acid, and 30 mole % of neopentyl glycol and 70 mole % of ethylene glycol, and 10 weight % of polybutylene terephthalate was melted at 280° C. and extruded from a T die and quenched by chill rolls to obtain an undrawn film.

(2) Preparation of Coating Solution

A 30% aqueous solution of IPA containing solid matter of water-based dispersion of a polyurethane resin (Hydran HW 345, manufactured by Dainippon Ink and Chemicals, Incorporated) 61% by weight in the total solid matter, solid matter of a water-based emulsion of polyethylene wax (HYTEC E-4BS, manufactured by Toho Chemical Industry Company, Limited) 30% by weight in the total solid matter, and solid matter of an aqueous antistatic agent solution (TB 214, manufactured by Matsumoto Yushi-Seiyaku Co., Ltd.) 9% by weight in the total solid matter was used as the coating solution.

(3) Production of Coated Film

The undrawn film obtained in (1) was coated with the coating solution prepared in (2) by a fountain method and heated until the film temperature was increased to 70° C. and then the film was drawn by a tenter 4.0 times in the transverse direction and heat-set at 80° C. to obtain a heat-shrinkable polyester type film with a thickness of 50 μm and coated with a coating of 0.015 g/m$^2$.

Example 2

A heat-shrinkable polyester type film was obtained in the same manner as Example 1, except that a 30% aqueous solution of IPA containing solid matter of water-based dispersion of a polyester resin (TIE 51, manufactured by TAKEMOTO OIL & FAT CO., LTD.) 68% by weight in the total solid matter, solid matter of a water-based emulsion of polyethylene wax (HYTEC E-4BS, manufactured by Toho Chemical Industry Company, Limited) 26% by weight in the total solid matter, and solid matter of an aqueous antistatic agent solution (TB 214, manufactured by Matsumoto Yushi-Seiyaku Co., Ltd.) 6% by weight in the total solid matter was used as the coating solution and the coating amount was changed to be 0.02 g/m$^2$.

Example 3

A heat-shrinkable polyester type film was obtained in the same manner as Example 1, except that an aqueous emulsion of polyethylene wax (HYTEC E-9015, manufactured by Toho Chemical Industry Company, Limited) was used.

Example 4

A heat-shrinkable polyester type film was obtained in the same manner as Example 2, except that an aqueous emulsion of polyethylene wax (HYTEC E-8237, manufactured by Toho Chemical Industry Company, Limited) was used.

Comparative Example 1

A heat-shrinkable polyester type film was obtained in the same manner as Example 1, except that the coating amount was changed to be 0.3 g/m$^2$.

Comparative Example 2

A heat-shrinkable polyester type film was obtained in the same manner as Example 2, except that the solid matter of water-based dispersion of a polyester resin (TIE 51, manufactured by TAKEMOTO OIL & FAT CO., LTD.) was changed to 25% by weight in the total solid matter and the solid matter of a water-based emulsion of polyethylene wax (HYTEC E-4BS, manufactured by Toho Chemical Industry Company, Limited) was changed to 69% by weight in the total solid matter.

Comparative Example 3

A heat-shrinkable polyester type film was obtained in the same manner as Example 1, except that the solid matter of the water-based dispersion of a polyurethane resin (Hydran HW 345, manufactured by Dainippon Ink and Chemicals, Incorporated) was changed to be 86% by weight in the total solid matter, the solid matter of the water-based emulsion of polyethylene wax (HYTEC E-4BS, manufactured by Toho Chemical Industry Company, Limited) was changed to be 8% by weight in the total solid matter, and the solid matter of an aqueous antistatic agent solution (TB 214, manufactured by Matsumoto Yushi-Seiyaku Co., Ltd.) was changed to be 6% by weight in the total solid matter.

Comparative Example 4

In Example 2, after the undrawn film was obtained, the film was heated to 70° C. film temperature without application of the coating solution and then the film was drawn by a tenter 4.0 times in the transverse direction and heat-set at 80° C. to obtain a heat-shrinkable polyester type film with a thickness of 50 μm, and it rolled in a roll.

The film roll was coated with the same coating solution as that applied to the undrawn film 1 by a gravure coater and dried at 40° C. by a drier to obtain a heat-shrinkable polyester type film coated with a coating of 0.02 g/m² in dry state.

Comparative Example 5

A heat-shrinkable polyester type film was obtained in the same manner as Comparative Example 4, except that the coating amount after drying was changed to be 0.015 g/m².

Example 5

A heat-shrinkable polyester type film was obtained in the same manner as Example 1, except that the solid matter of the water-based dispersion of a polyurethane resin (Hydran HW 345, manufactured by Dainippon Ink and Chemicals, Incorporated) was changed to be 70% by weight in the total solid matter, the solid matter of the water-based emulsion of polyethylene wax (HYTEC E-4BS, manufactured by Toho Chemical Industry Company, Limited) was changed to be 30% by weight in the total solid matter, and the aqueous antistatic agent solution was not added.

The formulation of raw materials and the properties of the respective films are shown in Table 1 and Table 2.

TABLE 1

| | Resin (type/wt. %) | | Wax (type/wt. %) | | AS agent (type/wt. %) | | Thickness (g/m²) | Coating manner |
|---|---|---|---|---|---|---|---|---|
| Example 1 | HW345 | 61 | E-4BS | 30 | TB214 | 9 | 0.015 | Inline |
| Example 2 | TIE51 | 68 | E-4BS | 26 | TB214 | 6 | 0.02 | Inline |
| Example 3 | HW345 | 61 | E-9015 | 30 | TB214 | 9 | 0.015 | Inline |
| Example 4 | TIE51 | 68 | E-8237 | 26 | TB214 | 6 | 0.02 | Inline |
| Comparative Example 1 | HW345 | 61 | E-4BS | 30 | TB214 | 9 | 0.3 | Inline |
| Comparative Example 2 | TIE51 | 25 | E-4BS | 69 | TB214 | 6 | 0.02 | Inline |
| Comparative Example 3 | HW345 | 86 | E-4BS | 8 | TB214 | 6 | 0.015 | Inline |
| Comparative Example 4 | TIE51 | 68 | E-4BS | 26 | TB214 | 6 | 0.02 | Off-line |
| Comparative Example 5 | TIE51 | 68 | E-4BS | 26 | TB214 | 6 | 0.015 | Off-line |
| Example 5 | HW345 | 70 | E-4BS | 30 | TB214 | 0 | 0.015 | Inline |

TABLE 2

| | Friction | | Abrasion resistance | Antistatic property | | |
|---|---|---|---|---|---|---|
| | Dynamic friction coefficient (μd) | Range (R) | Abrasion amount (g/m²) | Surface specific resistance (logΩ) | Solvent bonding property | Shrinkage ratio (%) |
| Example 1 | 0.19 | 0.00 | 0.12 | 10.2 | ○ | 60 |
| Example 2 | 0.22 | 0.02 | 0.11 | 10.8 | ○ | 60 |
| Example 3 | 0.20 | 0.01 | 0.15 | 10.4 | ○ | 59 |
| Example 4 | 0.19 | 0.02 | 0.11 | 10.1 | ○ | 60 |
| Comparative Example 1 | 0.21 | 0.03 | 0.33 | 9.4 | X | 59 |
| Comparative Example 2 | 0.18 | 0.01 | 0.28 | 10.5 | X | 60 |
| Comparative Example 3 | 0.34 | 0.04 | 0.42 | 11.8 | ○ | 60 |
| Comparative Example 4 | 0.25 | 0.03 | 0.30 | 10.6 | ○ | 60 |
| Comparative Example 5 | 0.25 | 0.03 | 0.33 | 11.3 | ○ | 61 |
| Example 5 | 0.27 | 0.04 | 0.14 | 15.2 | ○ | 60 |

When each of the obtained film rolls (500 m×2 rolls) was passed in a printing apparatus at a line speed 100/min, no wear debris was observed in any of guide rolls in the case of the films of Examples 1 to 4 and on the other hand, when films of Comparative Examples 1 to 5 were used, with eye observation, white powder-like wear debris were found sticking notably to the metal guide rolls (surface-processed with alumite, 740 mm diameter) near the rolling out part among the rolls which were brought into contact with the easily slipping coating faces.

After each obtained film was thermally shrunk and attached to 500 ml beverage PET bottles in a manner that the easily slipping face was in the outer face side and then PET bottles were fed to an automatic venting machine. No clogging took place among 500 bottles in the case of the films of Examples 1 to 4. On the other hand, 1 among 500 bottles was clogged for Comparative Examples 5 and 6, and 4 among 500 bottles were clogged for Comparative Example 3.

Example 6

A polyester composition containing 6 mass % of polyethylene terephthalate, 14 mass % of polyester comprising 100 mole % of terephthalic acid, 30 mole % of neopentyl glycol and 70 mole % of ethylene glycol, 24 mass % of polybutylene terephthalate, and 56 mass % polyester comprising 100 mole % of terephthalic acid, 30 mole % of 1,4-cyclohexanedimethanol and 70 mole % of ethylene glycol was melted at 280° C. and extruded from a T die and quenched by chill rolls to obtain an undrawn film.

Separately, a 30% by mass water-based dispersion of isopropanol (IPA) containing a water-based dispersion of a polyester resin (TIE 51, manufactured by TAKEMOTO OIL & FAT CO., LTD.) 53% by mass on the basis of solid matter, a water-based emulsion of polyethylene wax 9HYTEC E-4BS, manufactured by Toho Chemical Industry Company, Limited) 40% by mass on the basis of solid matter, and an aqueous sodium sulfonate solution (trade name: Effcol 214, manufactured by Matsumoto Yushi-Seiyaku Co., Ltd.) 7% by mass on the basis of solid matter was used as the coating solution.

Successively the undrawn film obtained above was coated with the coated solution prepared by a fountain method and heated until the film temperature was increased to 70° C., and then the film was drawn by a tenter 4.0 times in the transverse direction and heat-set d at 80° C. to obtain a heat-shrinkable polyester type film with a thickness of 50 μm and coated with a coating of 0.05 g/m$^2$.

Example 7

A heat-shrinkable polyester type film was obtained in the same manner as Example 6, except that a water-based dispersion of a polyurethane resin (Hydran HW 345, manufactured by Dainippon Ink and Chemicals, Incorporated) was added in place of the water-based dispersion of the polyester resin.

Example 8

A heat-shrinkable polyester type film was obtained in the same manner as Example 6, except that a water-based emulsion of microcrystalline wax (trade name; Nopco 1245-M-SN, manufactured by San Nopco Limited) was used in place of the water-based emulsion of the polyethylene wax.

Example 9

A heat-shrinkable polyester type film was obtained in the same manner as Example 7, except that sodium diphenyl ether sulfonate (trade name; TB 702, manufactured by Matsumoto Yushi-Seiyaku Co., Ltd.) was used in place of the aqueous sulfonic acid salt solution.

Example 10

A heat-shrinkable polyester type film was obtained in the same manner as Example 7, except that sodium alkylbenzenesulfonate (trade name; Invadiile BCN, manufactured by Ciba Specialty Chemicals Co.) was used in place of the aqueous sulfonic acid salt solution.

Examples 11 to 14 and Comparative Examples 6 to 9

Heat-shrinkable polyester type films were obtained in the same manner as Example 6, except that the types and the amounts of the binder resins, the types and the amounts of the lubricating components, the types and the amounts of the stearic acid components, and the deposition amounts of the easily slipping layers were changed as shown in Table 3.

The formulation of raw materials and the properties of the respective films are shown in Table 3 and Table 4.

TABLE 3

|  | Resin (type/wt. %) | | Wax (type/wt. %) | | AS agent (type/wt. %) | | Thickness (g/m$^2$) | Coating manner |
|---|---|---|---|---|---|---|---|---|
| Example 6 | TIE51 | 53 | E-4BS | 40 | TB214 | 7 | 0.05 | Inline |
| Example 7 | HW345 | 53 | E-4BS | 40 | TB214 | 7 | 0.05 | Inline |
| Example 8 | TIE51 | 53 | San Nopco | 40 | TB214 | 7 | 0.05 | Inline |
| Example 9 | HW345 | 53 | E-4BS | 40 | TB702 | 7 | 0.05 | Inline |
| Example10 | HW345 | 53 | E-4BS | 40 | ABS | 7 | 0.05 | Inline |
| Example 11 | HW345 | 45 | E-4BS | 50 | TB214 | 5 | 0.05 | Inline |
| Example 12 | TIE51 | 53 | San Nopco | 40 | TB214 | 7 | 0.02 | Inline |
| Example 13 | TIE51 | 59.5 | San Nopco | 40 | TB214 | 0.5 | 0.05 | Inline |
| Comparative Example 6 | TIE51 | 20 | San Nopco | 35 | TB214 | 45 | 0.05 | Inline |
| Comparative Example 7 | HW345 | 85 | E-4BS | 8 | TB214 | 7 | 0.05 | Inline |
| Example 14 | HW345 | 23 | E-4BS | 70 | TB214 | 7 | 0.05 | Inline |
| Comparative Example 8 | HW345 | 53 | E-4BS | 40 | TB214 | 7 | 0.6 | Inline |
| Comparative Example 9 | HW345 | 53 | E-4BS | 40 | TB214 | 7 | 0.001 | Inline |

TABLE 4

| | Friction | | Antistatic property | Abrasion resistance | Transparency | Solvent bonding | Shrinkage ratio |
| | Dynamic friction coefficient μd | Range R | Surface specific resistance logΩ | Abrasion amount g/m² | Haze | property | % |
|---|---|---|---|---|---|---|---|
| Example 6 | 0.17 | 0.01 | 10.2 | 0.18 | ○ | ○ | 60 |
| Example 7 | 0.20 | 0.01 | 10.6 | 0.17 | ○ | ○ | 62 |
| Example 8 | 0.22 | 0.02 | 11.0 | 0.17 | ○ | ○ | 61 |
| Example 9 | 0.18 | 0.01 | 11.8 | 0.18 | ○ | ○ | 62 |
| Example 10 | 0.21 | 0.02 | 11.2 | 0.18 | ○ | ○ | 61 |
| Example 11 | 0.17 | 0.00 | 10.9 | 0.16 | ○ | ○ | 60 |
| Example 12 | 0.17 | 0.02 | 11.8 | 0.11 | ○ | ○ | 60 |
| Example 13 | 0.20 | 0.03 | 14.3 | 0.14 | ○ | ○ | 60 |
| Comparative Example 6 | 0.33 | 0.14 | 9.0 | 0.36 | X | ○ | 61 |
| Comparative Example 7 | 0.32 | 0.04 | 11.8 | 0.42 | ○ | ○ | 61 |
| Example 14 | 0.19 | 0.01 | 11.0 | 0.16 | X | X | 61 |
| Comparative Example 8 | 0.18 | 0.00 | 10.1 | 0.47 | X | X | 61 |
| Comparative Example 9 | 0.41 | 0.10 | 14.4 | 0.12 | ○ | ○ | 60 |

Example 15 and Comparative Examples 10 and 11

Polyesters to be used for Example 15 and Comparative Examples 10 and 11 were as follows.

Polyester A: poly(ethylene terephthalate) (IV 0.75)
Polyester B: polyester comprising 100 mole % of terephthalic acid, and 70 mole % of ethylene glycol and 30 mole % of neopentyl glycol (IV 0.72)
Polyester C: polyester elastomer (reduced viscosity (ηsp/c) 1.30) comprising 70 weight % of poly(butylene terephthalate) and 30 weight % of ε-caprolactone.

Example 15

As a raw material of an A layer, a polyester composition containing 30 weight % of polyester A, 65 weight % of polyester B and 5 weight % of polyester C, and as a raw material of a B layer, 10 weight % of polyester A, 65 weight % of polyester B, 5 weight % of polyester C, 10 weight % of crystalline polystyrene resin (G797N, manufactured by Nippon Polystyrene Co., Ltd.) and 10 weight % of titanium dioxide (TA-300, manufactured by Fuji Titanium Industry Co., Ltd.) were separately fed to an extruder and mixed. The mixture was melted, bonded by feed blocks, and extruded from a T-die at 280° C. while being laminated at the thickness ratio of A/B/A of 12.5 μm/25 μm/12.5 μm (after drawing) and quenched by chill rolls to obtain an undrawn film.

The undrawn film was coated with a coating solution prepared as follows by a fountain die-smoothing bar method and heated until the film temperature was increased to 70° C. and then the film was drawn by a tenter 4.0 times in the transverse direction to obtain a heat-shrinkable polyester type film with a coating of 0.05 g/m² and a thickness of 50 μm.

Preparation of the coating solution: a 30% aqueous solution of IPA containing water-based dispersion of a polyether resin (TIE 51, manufactured by TAKEMOTO OIL & FAT CO., LTD.) 53% by weight on the basis of solid matter, a water-based emulsion of polyethylene wax (HYTEC E-4BS, manufactured by Toho Chemical Industry Company, Limited) 40% by weight on the basis of solid matter, and an aqueous sodium sulfonate solution (Effcol 214, manufactured by Matsumoto Yushi-Seiyaku Co., Ltd.) 7% by weight on the basis of solid matter was used as the coating solution.

Comparative Example 10

A heat-shrinkable polyester type film with 50 μm thickness was obtained in the same manner as Example 15, except that no coating was formed.

Comparative Example 11

A heat-shrinkable polyester type film with 50 μm thickness was obtained in the same manner as Example 15, except that the formulation of coating solution was changed.

Preparation of the coating solution: a 30% aqueous solution of IPA containing an aqueous sodium sulfonate solution (Effcol 214, manufactured by Matsumoto Yushi-Seiyaku Co., Ltd.) 7% by weight on the basis of solid matter was used as the coating solution.

Reference Examples 1 and 2

The insertion resistance values of labels obtained by printing on transparent films are shown.

The evaluation results of the films obtained in Example 15 and Comparative Examples 10 and 11 are also shown in Table 5.

TABLE 5

| | Label insertion resistance | | Dynamic friction coefficient | Surface specific resistance | Total luminous transmittance | Hot water shrinkage ratio 98° C. · 10 seconds | | Solvent bonding |
|---|---|---|---|---|---|---|---|---|
| | In absence of water | In presence of water | | | | | | |
| | N | N | μd | logΩ | % | Vertical | Transverse | property |
| Example 15 | 0.05 | 0.57 | 0.17 | 10.2 | 27 | 1.0 | 73.0 | ○ |
| Comparative Example 10 | 0.28 | 1.58 | 0.60 | 10.6 | 27 | 1.0 | 73.0 | ○ |
| Comparative Example 11 | 0.19 | 1.09 | 0.28 | 9.8 | 27 | 1.0 | 73.0 | ○ |
| Reference Example 1 | 0.20 | 0.56 | 0.16 | — | — | — | — | — |
| Reference Example 2 | 0.50 | 1.31 | 0.22 | — | — | — | — | — |

As being clearly understood from Table 5, the heat-shrinkable polyester type film obtained in Example 15 was found suitable as a heat-shrinkable polyester type film for a full label of a PET bottle and having good slipping property to the PET bottle without white color printing. The heat-shrinkable polyester type film of the second invention has a high quality and practical usability and is suitable for wrapping shrinkable label of contents, particularly those which are easily deteriorated.

On the other hand, the heat-shrinkable polyester type films obtained in Comparative Examples 10 and 11 were found having high label insertion resistance although having light ray cutting function and therefore required to have slipping property by further processing. As described, the heat-shrinkable polyester type films of Comparative Examples are inferior in the quality and practical usability.

EFFECTS OF THE INVENTION

The heat-shrinkable polyester type film of the first invention is a film excellent in slipping property and effective to prevent clogging in an automatic venting machine in the case of using it for a beverage label and having excellent abrasion resistance.

The heat-shrinkable polyester type film of the second invention has a light ray cutting function without printing and a good slipping property to a PET bottle without requiring white color printing. Accordingly, the film is remarkably useful for a label and particularly as a heat-shrinkable polyester type film with a high product value.

The invention claimed is:

1. A heat-shrinkable polyester film comprising an easily slipping layer, wherein
    the easily slipping layer comprises a lubricant, a binder resin, and a sulfonic acid component, and the lubricant is at least one selected from the group consisting of paraffin wax, microcrystalline wax, polypropylene wax, polyethylene wax, ethylene-acrylic wax, stearic acid, behenic acid, 12-hydroxystearic acid, stearic acid amide, oleic acid amide, erucic acid amide, methylene bis(stearic acid amide), ethylene bis(stearic acid amide), ethylene bis(oleic acid amide), butyl stearate, stearic acid monoglyceride, pentaerythritol tetrastearate, cured castor oil, stearyl stearate, siloxane, stearyl alcohol, calcium stearate, zinc stearate, magnesium stearate and lead stearate,
    the deposition amount of the easily slipping layer is 0.002 to 0.02 g/m$^2$,
    the easily slipping layer containing the lubricant component 10 to 60% by weight in 100% by weight of the layer is provided on an easily slipping face,
    the easily slipping layer contains a polyester type resin or a polyurethane resin as the binder resin,
    the film has a shrinkage ratio 50% or higher in the main shrinkage direction when being immersed in hot water at 95° C. for 10 seconds,
    the film has a dynamic friction coefficient of at least one face with one face of another film of μd<0.27 and range R<0.05, and
    a weight loss per unit surface area of the treated part of less than 0.24 g/m$^2$ after 10 reciprocation times when the film is subjected to reciprocating abrasion treatment under conditions of 30 reciprocation times/min in 100 mm reciprocating distance with 400 g load using a color fastness rubbing tester comprising a friction element having surface radius 45 mm; arc 50 mm; and width 25 mm, to which two sheets of gauze and a sand paper with #1000 particle diameter are attached in a manner that the sand paper is set in the front face side while the film sample is set on a sample stand having surface radius 200 mm in a manner that the face having a smaller friction coefficient is set in the front face side.

2. The heat-shrinkable polyester film according to claim 1, wherein the dynamic friction coefficient of at least one face with one face of another film is μd<0.25 and range R<0.03.

3. The heat-shrinkable polyester film according to claim 2, wherein the weight loss is less than 0.20 g/m$^2$ after the face of the film is subjected to reciprocating abrasion 10 times with 400 g load using a color fastness rubbing tester comprising a friction element bearing a sand paper with #1000 particle diameter.

4. The heat-shrinkable polyester film according to claim 2, wherein a surface specific resistance of at least one face of the film satisfies log Ω<14.0.

5. The heat-shrinkable polyester film according to claim 2, wherein a surface specific resistance of at least one face of the film satisfies log Ω<12.0.

6. The heat-shrinkable polyester film according to claim 1, wherein the weight loss is less than 0.20 g/m$^2$ after the face of the film is subjected to reciprocating abrasion 10 times with 400 g load using a color fastness rubbing tester comprising a friction element bearing a sand paper with #1000 particle diameter.

7. The heat-shrinkable polyester film according to claim 6, wherein a surface specific resistance of at least one face of the film satisfies log Ω<14.0.

8. The heat-shrinkable polyester film according to claim 6, wherein a surface specific resistance of at least one face of the film satisfies log Ω<12.0.

9. The heat-shrinkable polyester film according to claim 1, wherein a surface specific resistance of at least one face of the film satisfies log Ω<14.0.

10. The heat-shrinkable polyester film according to claim 1, wherein a surface specific resistance of at least one face of the film satisfies log Ω<12.0.

11. The heat-shrinkable polyester film according to claim 1, wherein one face of the film is capable to be bonded to the other face by an organic solvent.

12. The heat-shrinkable polyester film according to claim 1, wherein the easily slipping layer contains the sulfonic acid component in an amount of 1 to 40% by weight in 100% by weight of the layer.

13. A method for producing heat-shrinkable polyester film according to claim 1, comprising applying a coating solution for the easily slipping layer containing a lubricating component and a sulfonic acid component to at least one face of a non-oriented polyester film or a uniaxially oriented polyester film obtained by melt extrusion, and then uniaxially or biaxially drawing the coated film.

14. The heat-shrinkable polyester film according to claim 1, wherein the lubricant is a polyethylene wax or microcrystalline wax.

15. The heat-shrinkable polyester film according to claim 1, further comprising an anti-static agent.

16. The heat-shrinkable polyester film according to claim 15, wherein the anti-static agent is at least one selected from the group consisting of quaternary ammonium salts, fatty acid polyhydric alcohol esters, polyoxyethylene adducts, betaine salts, alanine salts, phosphate salts, sulfonic acid components, sulfonic acid salts, and polyacrylic acid derivatives.

17. The heat-shrinkable polyester film according to claim 15, wherein the anti-static agent is selected from sulfonic acid salts.

* * * * *